United States Patent [19]

Gellert

[11] Patent Number: 4,761,343
[45] Date of Patent: Aug. 2, 1988

[54] INJECTION MOLDING MANIFOLD SYSTEM HAVING BALANCED BRIDGING MANIFOLD

[76] Inventor: Jobst U. Gellert, 7A Prince Street, Georgetown, Ontario, Canada, L7G 4X5

[21] Appl. No.: 41,655

[22] Filed: Apr. 21, 1987

Related U.S. Application Data

[63] Continuation of Ser. No. 786,063, Oct. 10, 1985, abandoned.

[30] Foreign Application Priority Data

Sep. 13, 1985 [CA] Canada ................... 490750

[51] Int. Cl.⁴ .............................................. B29C 45/22
[52] U.S. Cl. ................... 425/547; 264/328.8; 264/328.14; 425/549; 425/570; 425/571; 425/588
[58] Field of Search ............... 425/547, 548, 549, 570, 425/571, 572, 581, 588, 573; 264/328.8, 328.14, 176 F

[56] References Cited

U.S. PATENT DOCUMENTS

| | | | |
|---|---|---|---|
| 3,496,261 | 2/1970 | Parr | 264/176 F |
| 3,951,375 | 4/1976 | Lovell | 425/573 |
| 4,212,626 | 7/1980 | Gellert | 425/572 |
| 4,219,323 | 8/1980 | Bright et al. | 425/572 |
| 4,333,629 | 6/1982 | Roy | 425/572 |
| 4,340,156 | 7/1982 | Muller | 425/549 |
| 4,439,915 | 4/1984 | Gellert | 29/611 |
| 4,497,624 | 2/1985 | Brun et al. | 425/548 |
| 4,521,179 | 6/1985 | Gellert | 425/549 |
| 4,563,149 | 1/1986 | Landis | 425/549 |
| 4,576,567 | 3/1986 | Gellert | 425/549 |
| 4,620,958 | 11/1986 | Wiechard | 425/572 |

OTHER PUBLICATIONS

Ewikon Brochure 01799 entitled, "Heisskanalsystem".
Plastics Mold Engineering Handbook, Van Nostrand Reinhold Company, 3rd Ed. 1978, pp. 197,360,362-364.

Primary Examiner—Jay H. Woo
Assistant Examiner—Timothy W. Heitbrink
Attorney, Agent, or Firm—Riches, McKenzie & Herbert

[57] ABSTRACT

This invention relates to an improved manifold system for a multi-cavity injection molding system. The manifold system has one elongated bridging manifold which extends transversely across a number of spaced elongated support manifolds. Each of the support manifolds, in turn, extend across a number of heated probes or nozzles, each of which leads to a gate to a cavity. The bridging manifold has a portion of the hot runner passage extending through it from a single inlet to receive melt from the molding machine to a number of spaced outlets. Each of the support manifolds also has an inlet which is in alignment with one of the outlets from the bridging manifold and a number of spaced outlets. Each of the outlets of the support manifolds is in alignment with an inlet to one of the probes or nozzles. Each of the manifold has two way junctions at which a larger diameter portion of the hot runner passage joins two smaller diameter downstream portions. In the bridging manifold, the hot runner passage extends along the same plane as the inlet and outlets, whereas in the support manifold the portion connecting the junctions extends in a transverse plane. Forming the manifold system of separate composite plate bridging and support manifolds with different melt passage orientations improves streamlined and uniform flow and reduces pressure drop while allowing flexibility of system design for different applications.

8 Claims, 4 Drawing Sheets

४,७६१,३४३

INJECTION MOLDING MANIFOLD SYSTEM HAVING BALANCED BRIDGING MANIFOLD

This application is a continuation of Ser. No. 786,063 filed Oct. 10, 1985 now abandoned.

BACKGROUND OF THE INVENTION

This invention relates generally to injection molding and more particularly to an improved heated manifold system for conveying pressurized melt from a single inlet to a number of spaced outlets each leading to a different cavity.

Multi-cavity injection molding is well known. Often the cavities are arranged in a row with a single elongated manifold conveying melt to a nozzle or probe leading to each of them. An example of this type of arrangement is shown in FIG. 1 of the applicant's U.S. patent application Ser. No. 725,799 filed Apr. 22, 1985 entitled "Composite Plate Method of Manufacturing Injection Molding Manifold" now U.S. Pat. No. 4,648,546 which is herein incorporated by reference. The cavities and manifold can also be arranged in an H or X shaped configuration and an example of this is shown in the applicant's U.S. Pat. No. 4,439,915 which issued Apr. 3, 1984 entitled "Heater Installation in Molding Members".

It is also known to form injection molding manifold systems of a number of interconnectable units rather than an integral system to provide more flexibiltiy in design. An example of this is shown in EWIKON Brochure 01799 entitled "Heisskanalsystem", although this discloses a type of "cold" manifold arrangement wherein the heating element is located in the melt passage itself rather than in the body of the manifold.

Reliability and speed of operation are, of course, very critical to the successful operation of this type of injection molding system. Therefore, it is very desirable that the volume of flow of melt through the branches of the hot runner passage be uniform with a minimal pressure drop regardless of the location of the various cavities relative to the inlet. It will be appreciated that this becomes more difficult as the number of cavities is increased to meet volume requirements.

SUMMARY OF THE INVENTION

Accordingly, it is an object of the present invention to at least partilly overcome the problems of the prior art by providing a manifold system having a bridging manifold interconnecting a number of support manifolds through which the hot runner passage extends an equal distance to each of the outlets to provide improved rheological balance.

To this end, in one of its aspects, the invention provides a heated bridging manifold for a multi-cavity injection molding system in which a hot runner passage to receive pressurized melt from a molding machine branches to convey the melt to a plurality of gates in a cooled cavity plate, each of the gates leading to a cavity, the manifold system comprising a plurality of spaced elongated support manifolds seated substantially parallel in a common plane in the cavity plate, each support manifold having first and second opposed faces and a portion of the hot runner passage which extends therethrough from a common inlet on the first face and branches to a plurality of outlets on the second face, and an elongated bridging manifold having first and second opposed faces and a portion of the hot runner passage which extends therethrough from a common inlet on the first face and branches to a plurality of outlets on the second face the number of outlets on the second face corresponding to the number of support manifolds, said bridging manifold being secured across the support manifolds with the second face of the bridging manifold abutting the first faces of each of the support manifolds and the inlet of each of the support manifold in alignment with one of the outlets of the bridging manifold whereby pressurized melt received at the hot runner passage inlet on the first face of the bridging manifold is conveyed an equal distance through the hot runner passage to each of the hot runner passage outlets on the second faces of each of the support manifolds.

Further objects and advantages of the invention will appear from the following description, taken together with the accompanying drawings.

DETAILED DESCRIPTION OF THE DRAWINGS

Figure 1:
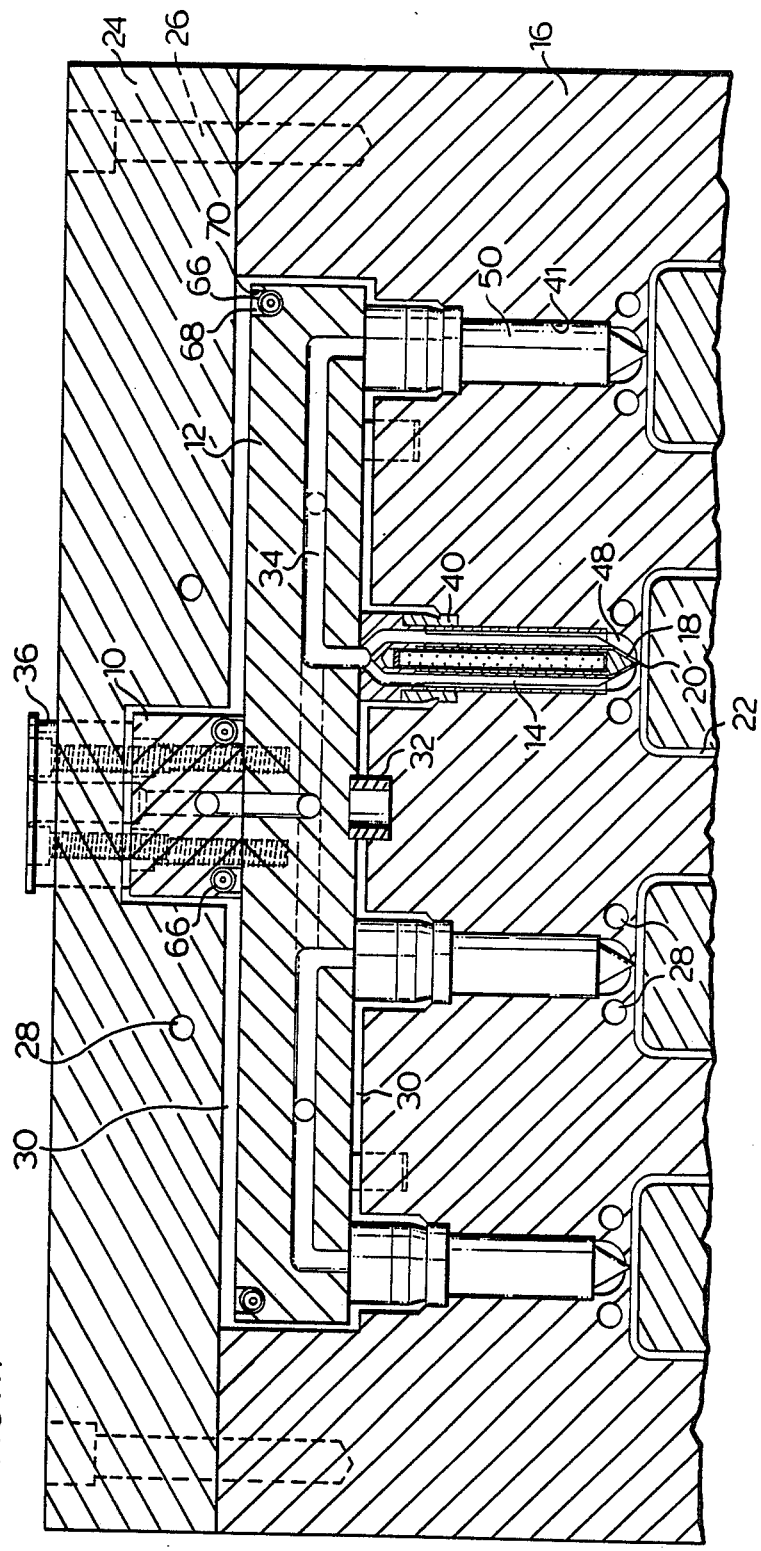
FIG. 1 is a partial sectional view showing a portion of an injection molding system having a manifold system according to a preferred embodiment of the invention.

Reference is first made to FIG. 1 which shows a portion of an injection molding system having a heated manifold system with a bridging manifold 10 interconnecting four support manifolds 12. Each support manifold 12 in turn is connected to a number of heated probes 14 which are seated in the cavity plate 16. The conical tip end 18 of each probe 14 is in alignment with a gate 20 which extends through the cavity plate 16 to a cavity 22. While this system shows the use of heated probes 14, the heated manifold system according to the invention can also be used with heated nozzles extending between the support manifolds 12 and the gates 20. A back plate 24 is secured to the cavity plate 16 by bolts 26. The cavity plate 16 and back plate 24 are cooled in a conventional manner by water flowing through cooling ducts 28. The heated manifold system is spaced from the cool cavity plate and back plate 24 by an insulative air gap 30 and is maintained in position by locating rings 32.

Figure 2:
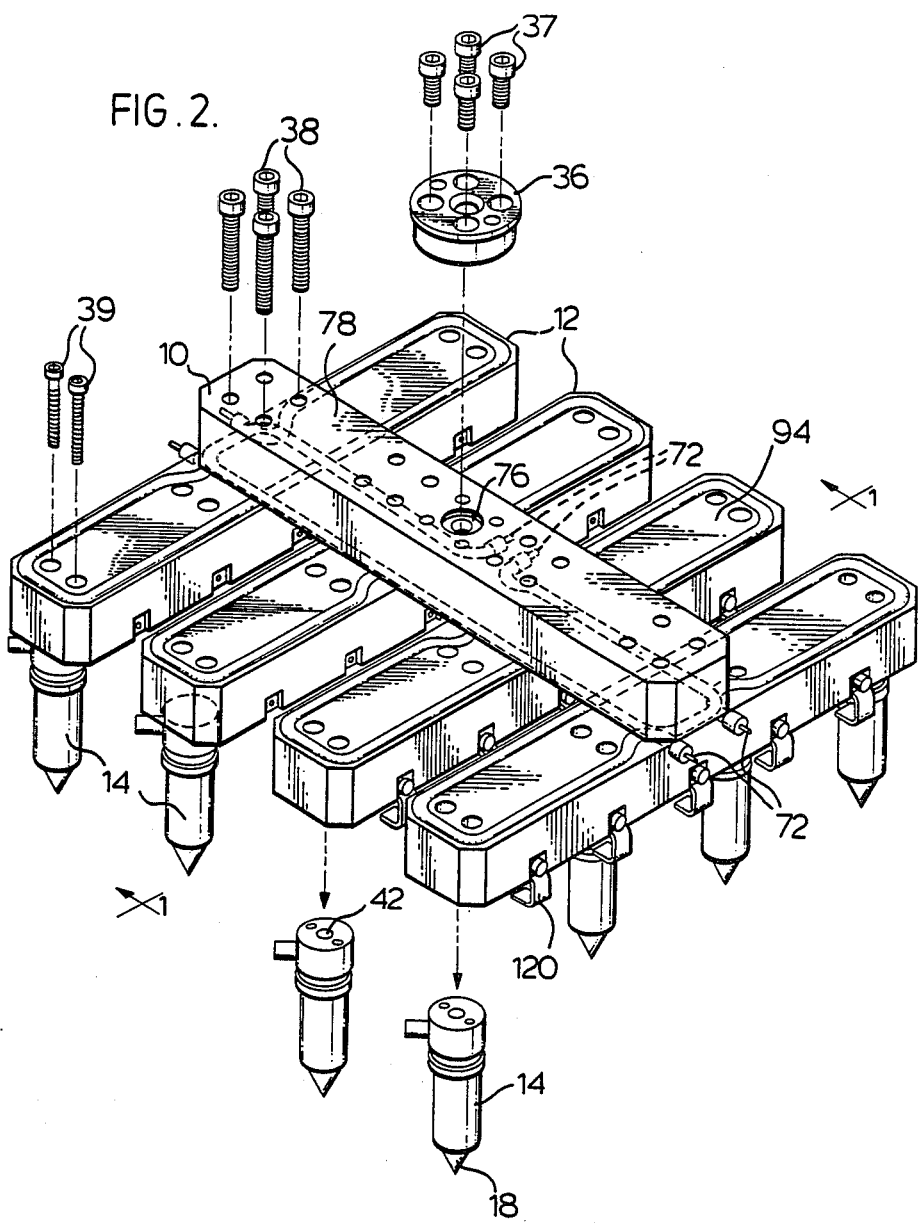
FIG. 2 is an isometric view showing the manifold system seen in FIG. 1.

As may be seen, the system has a hot runner passage 34 which distributes the hot pressurized melt received from the molding machine to the various cavities 22. The hot runner passage 34 extends from the inlet collar 36 which receives the mouth of the molding machine nozzle, through the bridging manifold 10 where it branches to the different support manifolds 12, through each support manifold 12 where it branches to the different probes 14, and through the probes to the respective gates 20. As clearly seen in FIG. 2, the inlet collar 36 is secured to the bridging manifold 10 by bolts 37, the bridging manifold 10 is secured to the support manifolds 12 by bolts 38, and the support manifolds are each secured to a number of the probes 14 by bolts 39. Pins (not shown) are provided to keep the various portions or branches of the hot runner passage 34 in alignment, even after thermal expansion, and prevent leakage.

The probes 14 which are used in this embodiment of the invention are described in detail in the applicant's U.S. patent application Ser. No. 537,054 filed Sept. 29, 1983 entitled "Injection Molding System having an Insulation Sleeve" now U.S. Pat. No. 4,576,567 Each probe 14 is seated on a cylindrical insulation bushing 40 in a well 41 in the cavity plate 16. The hot runner passage enters each probe 14 at an inlet 42 from which a pair of melt channels 44 extend diagonally outward to join longitudinally extending grooves 46. These grooves extend into a space 48 around the conical tip end 18 of the probe 14. A generally cylindrical insulating sleeve 50 is located between the probe 14 and the well 40. The sleeve 50 is formed of a thermoplastic material having a high melting temperature and a low thermal conductivity such as PEEK (a trade name for polyetheretherketone of The General Electric Company. It fits over a downstream portion of the probe and has a pair of inwardly open grooves 52 which align with the outwardly open grooves 46 of the probe 14.

Figure 4:
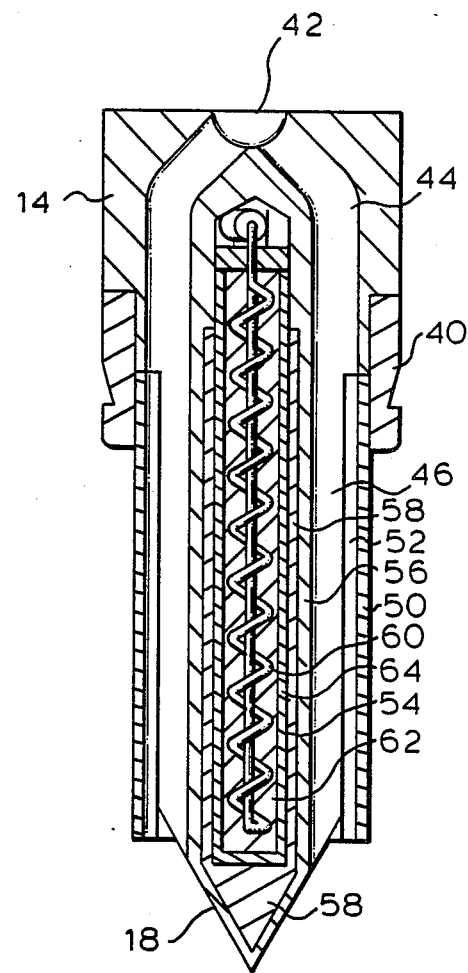
FIG. 4 is a sectional view of one of the nozzles seen in FIG. 1.

As more clearly seen in FIG. 4, each probe 14 has a conventional cartridge heater 54 sealed in a tool steel outer body 56 by a cast in copper portion 58 to provide an integral structure. The cartridge heater 54 has an electric heating coil 60 extending through magnesium oxide powder 62 in a metal casing 64. The highly conductive copper portion 58 is bonded between the cartridge heater 54 and the steel outer body and thus rapidly and evenly distributes heat from the heater along the grooves 46 and into the conical tip end 18 of the probe 14.

The bridging manifold 10 and support manifold 12 are made of tool steel by the composite plate methods described in the applicant's U.S. patent application Ser. No. 725,799 referred to above. Each manifold is heated by an electric heating element 66 which is cast in copper 68 in a channel 70 extending around one surface of the manifold. In this embodiment, the heating elements 66 are located in the abutting surfaces of the bridging and support manifolds, but this need not necessarily be the case. Each heating element 66 has terminal ends 72 which project from the manifold and are connected to a source of electric power (not shown) which is controlled in a conventional manner to maintain the manifold at a desired temperature.

Each manifold is made by brazing the abutting surfaces of two plates of steel together along a common plane in a vacuum furnace. The portion of the hot runner passage 34 extending through each manifold is formed by milling matching grooves in these surfaces before they are joined. This method eliminates some of the problems associated with the previous method of gun drilling these bores and, particularly, reduces the number of sharp bends as corners required in the melt passage. This streamlined flow reduces pressure drop and shear of the melt which can cause decomposition of some engineering materials such as polyvinyl chloride and some polyesters.

Figure 3:
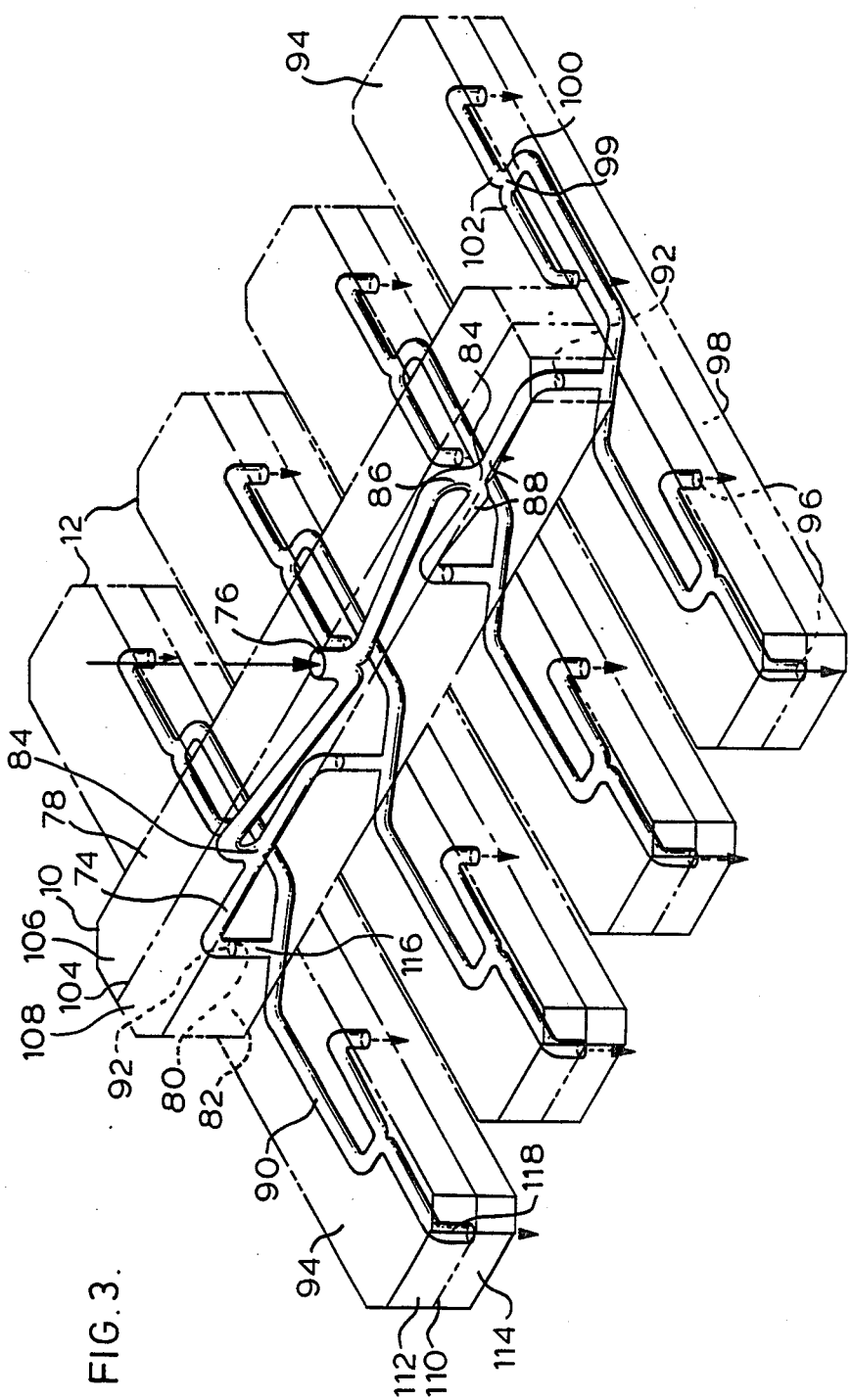
FIG. 3 is a similar schematic view showing the configuration of the hot runner passage through the manifold system.

The configuration of the hot runner passage 34 extending through the bridging manifold system according to this embodiment of the invention will now be described with particular reference to FIG. 3 of the drawings. As may be seen, the elongated manifolds are generally rectangular with flat faces. The bridging manifold 10 is secured across the support manifolds 12, as described above. A portion 74 of the hot runner passage 34 extends through the bridging manifold 10 from an inlet 76 on one face 78 and branches out to a number of outlets 80 on the opposing face 82. The inlet 76 is in alignment with the inlet collar 36 to receive melt from the molding machine. In order that the melt flow and pressure drop be equal to each of the outlets, branching is accomplished by providing the hot runner passage 34 with a number of two way forks or junctions 84. Thus, at each junction 84, the hot runner passage 34 has an upstream portion 86 which joins two downstream portions 88. This hot runner passage configuration requires the melt to flow the same distance regardless which outlet 80 it goes to. It also provides an even number of outlets 80. Furthermore, in order to further reduce the pressure drop of the melt flowing through the manifold 10, the hot runner passage 34 is made with the upstream portion 86 at each junction 84 larger in diameter than the two equal diameter downstream portions 88. Making the hot runner passage 34 with different diameter portions and smooth curves and bends to streamline flow and reduce pressure drop is relatively easy using the composite plate method of manufacture.

Similarly, a portion 90 of the hot runner passage 34 extends through each of the support manifolds 12 from an inlet 92 on one face 94 and branches out to a number of outlets 96 on the opposing face 98. Of course, the inlet 92 of each support manifold 12 is in alignment with one of the outlets 80 of the bridging manifold 10, and each outlet 96 of each support manifold 12 is in alignment with the inlet 42 to one of the probes 14 at temperature. The portion 90 of the hot runner passages in each support manifold 12 also has a number of junctions 99 at which an upstream portion 100 joins a pair of downstream portions 102. While the upstream portion 100 may be larger in diameter than the two equal diameter downstream portions 102, this is not as critical to pressure drop as in the bridging manifold because of the smaller volume of flow.

While each of the bridging manifold 10 and the support manifolds 12 are shown in this embodiment with a single inlet and four outlets, it is apparent that they could each have only two or a greater number of outlets. While the configuration of the hot runner passage in the bridging manifold and the support manifolds are similar, in this embodiment they have a different orientation. As seen in FIG. 3, the bridging manifold 10 has the common plane 104 along which the two plates 106, 108 are joined extending perpendicular to the two opposed faces 78, 82, and the whole portion of the hot runner passage extends along it. On the other hand, in the support manifolds 12, the common plane 110 along which the composite plates 112, 114 are joined extends parallel to the opposed faces 94, 98 on which the inlet 92 and outlets 96 are located. While the junctions 99 and the part of the hot runner passage 34 interconnecting them are located on the common plate 110, as described in U.S. patent application Ser. No. 725,799 referred to above, the hot runner passage 34 is extended to the inlet 92 and outlets 96 by an inlet hole 116 and outlet holes 118 drilled through the respective plates 112, 114 before they are brazed together. This orientation of the hot runner passage 34 in support manifolds 12 has the disadvantage that there are more sharp corners or bends compared to the orientation of the bridging manifold 10. However, it has the advantage that more outlets 96 can be provided without increasing the height or thickness of the support manifolds, which can be a very important factor in injection molding system design. If the hot runner passage 34 in the bridging manifold 10 is formed with another lead of junctions 84 to provide more outlets 80, it is apparent that the bridging manifold must be given more height because they are in the same plane 104 as the inlet 76 and outlets 80. Thus, by providing a manifold system with separate bridging and support manifolds having different melt passage orientations, a considerable degree of flexibility in system design is achieved.

In use, the system is assembled as shown and power is applied to the various heating elements to heat the manifolds and probes to a predetermined operating temperature. The leads to the various probes 14 are retained in place beneath the respective support manifolds 12 by L-shaped clips 120 which are fastened to the manifolds. The molding machine mouth (not shown) is applied to the inlet collar 36 to introduce hot pressurized melt into the melt passage 34 according to a predetermined cycle. The melt flowing through the hot runner passage branches out to each of the probes 14 and fills the space 48 around the tip end 18 of each probe before entering the cavities 22 through the respective gates 20. After the cavities are filled, pressure is relieved by the injection molding machine after a short packing and cooling period. The mold is then opened to eject the molded products in a conventional manner, the mold is reclosed, and the cycle is repeated. It is essential that all of the cavities fill properly on a continuous basis. Therefore, equal flow and low pressure drop of the melt through the system is very important.

While the description of this system has been given with respect to a particular embodiment, it is not to be construed in a limiting sense. Variations and modifications will occur to those skilled in the art. In particular, it is apparent that the system can be designed with different numbers of support manifolds and probes. Reference is made to the attached claims for a definition of the invention.

What I claim is:

1. A heated balanced bridging manifold system for a multi-cavity injection molding system in which a hot runner passage conveys pressurized melt from a molding machine, through manifolds and to a plurality of gates in a cooled cavity plate, each of the gates leading to a cavity and being at an equal fluid flow distance from the molding machine, the manifold system comprising:

(a) spaced apart, separate support manifolds disposed substantially in a common plane, each support manifold having first and second support manifold opposed faces with at least one heater element embedded in at least one face and the portion of the hot runner passage which extends therethrough branches from a common support manifold inlet on the first face to a plurality of support manifold outlets on the second face and all bends in the said branches are smooth curves to streamline the flow of the presurized melt, the fluid flow distance from the common support manifold inlet to each support manifold outlet being the same, and the portion of the hot runner passage extending through each of the support manifolds has at least one junction whereat a pair of equal diameter downstream portions of the hot runner passage join an upstream portion of the hot runner passage, whereby an even number of support manifold outlets are provided and the pressure drop of the melt to each of the support manifold outlets on the second face is substantially equal; and (b) a separate, single heated bridging manifold having first and second bridging manifold opposed faces with at least one heater element embedded in at least one face and the portion of the hot runner passage which extends therethrough branches from a bridging manifold common inlet on the first face to a plurality of bridging manifold outlets on the second face and all bends in the said branches are smooth curves to streamline the flow of the pressurized melt, the number of bridging manifold outlets on the second face corresponding to the number of support manifolds, and the fluid flow distance from the bridging manifold common inlet to each bridging manifold outlets being the same, said bridging manifold being releasably secured across the top of the support manifolds with the second face of the bridging manifold abutting the first faces of each of the support manifolds and the common support manifold inlet of each of the support manifolds is in alignment with one of the outlets of the bridging manifold, the portion of the hot runner passage extending through the bridging manifold having at least one junction whereat a pair of equal diameter downstream portions of the hot runner passage join an upstream portion of the hot runner passage, whereby an even number of bridging manifold outlets are provided and the pressure drop of the melt to each of the bridging manifold outlets on the second face is substantially equal, whereby pressurized melt received at the hot runner passage bridging manifold inlet on the first face of the bridging manifold is conveyed an equal distance through the hot runner passage to each of the hot runner support manifold outlets on the second face of each of the support manifolds.

2. A manifold system as claimed in claim 1 wherein the portion of the hot runner passage extending through the bridging manifold is located in a common plane which extends substantially perpendicular to the first and second opposed faces of the bridging manifold.

3. A manifold system as claimed in claim 2 wherein the part of the portion of the hot runner passage extending through each of the support manifolds which contains the junctions is located in a common plane which extends substantially parallel to the first and second opposed faces of that support manifold.

4. A manifold system as claimed in claim 1 wherein the diameter of the upstream portion of the hot runner passage at each junction of the bridging manifold is larger than the diameter of the two equal diameter downstream portions.

5. A manifold system as claimed in claim 1 wherein the diameter of the upstream portion of the hot runner passage at each junction of each support manifold is larger than the diameter of the two equal diameter downstream portions.

6. A manifold system as claimed in claim 4 wherein the bridging manifold and each of the support manifolds has a cast in electrical heating element.

7. A manifold system as claimed in claim 1, wherein each support manifold is positioned across a row of heated probes, each of which probe is seated in the cavity plate and has an inlet in alignment with one of the hot runner passage outlets on the second face of the support manifold.

8. A manifold system as claimed in claim 1, wherein each support manifold is positioned across a row of heated nozzles, each of which nozzle is seated in a cavity plate and has an inlet in alignment with one of the hot runner passage outlets on the second face of the support manifold.

* * * * *